United States Patent [19]

Werthmann

[11] 4,309,120

[45] Jan. 5, 1982

[54] COMPOUND CLAMP

[76] Inventor: Paul E. Werthmann, 530 Alyce Ln., Aurora, Ill. 60505

[21] Appl. No.: 3,114

[22] Filed: Jan. 15, 1979

[51] Int. Cl.³ .............................................. F16B 7/04
[52] U.S. Cl. .................................... 403/18; 403/321; 403/397; 24/339
[58] Field of Search ............. 24/81 CR, 129 B, 81 B; 403/18, 321, 385, 389, 397, 400; 248/229, 230; 292/306; 256/54, DIG. 3, 48, 53; 404/84; 52/365, 678, 686, 719

[56] References Cited

U.S. PATENT DOCUMENTS

| | | | |
|---|---|---|---|
| 430,400 | 6/1890 | Page | 292/306 |
| 3,154,276 | 10/1964 | Havener | 248/229 X |
| 3,539,138 | 11/1970 | Desroches | 24/81 CR X |

FOREIGN PATENT DOCUMENTS

| | | | |
|---|---|---|---|
| 220746 | 3/1959 | Australia | 403/400 |
| 179042 | 4/1962 | Sweden | 248/356 |
| 13369 | of 1896 | United Kingdom | 403/400 |

*Primary Examiner*—Andrew V. Kundrat

[57] ABSTRACT

A compound clamp having two crossed resilient yokes formed from an integral metal piece. The yokes comprise a flat base section for the two yokes, two long resilient and apertured arms projecting from a first set of opposite sides of the base section to define a first generally concave long yoke configuration, and two short resilient and apertured arms projecting from a second set of opposite sides of the base section to define a second generally concave short yoke configuration. The insertion of a first elongated element through the apertures of the long yoke and insertion of a second elongated element through the apertures of the short yoke effects the adjustable cross clamping of the two elongated elements.

1 Claim, 6 Drawing Figures

COMPOUND CLAMP

BACKGROUND OF THE INVENTION

Devices for adjustably clamping two elongated elements with respect to one another are well known in the prior art. Such compound clamps are employed extensively in the construction industry, for example, to effect the proper positioning of a construction stringline. A stringline, which serves as a guide for an automatic machine control employed in construction work, must be properly disposed both horizontally and vertically so that the machine under control will be accurately guided.

In the main, such a stringline is supported on a stringline rod, which is generally horizontally disposed and is formed with a stringline engaging groove. The line rod is clamped to a vertically disposed stake by an adjustable clamp. The clamp adjustment mechanisms employed in the prior art are generally mechanical in nature, and as such often required the use of wrenches or screwdrivers to effect the necessary adjustment. This has often resulted in bent adjustment screws or stripped threads which may permanently damage the clamp bracket.

Additionally, the use of auxiliary tools, such as screwdrivers and socket wrenches to adjust these clamps, is time consuming and therefore increases construction costs.

Moreover, many of the prior art stringline clamps do not provide independent horizontal and vertical adjustments of the stringline. Unless such adjustments are independently provided, an excessive number of repeated readjustments are required until final stringline grade is achieved.

Prior art clamps for engaging one or more elongated elements are shown in U.S. Pat. Nos. 2,123,425; 2,968,850; 3,045,499 and 3,233,297.

SUMMARY OF THE INVENTION

Accordingly, a principal object of this invention is to provide an improved manually operated compound clamp which can achieve independent vertical and horizontal adjustments of one elongated element with respect to a second elongated element.

A second object is to provide an improved compound clamp which is quickly adjustable and which does not require repeated readjustments to attain the required disposition of one elongated element with respect to a second elongated element.

A third object is to provide an improved compound clamp, which when used in large numbers, requires a minimum of storage and shipping space.

The structure for attaining the foregoing objects is briefly described in the foregoing Abstract and is described in detail in the following Detailed Description of the Invention.

DETAILED DESCRIPTION OF THE DRAWINGS

In order that all of the structural features for attaining the objects of this invention may be understood, reference is made to the accompanying drawings wherein.

DETAILED DESCRIPTION OF THE INVENTION

Figure 1:
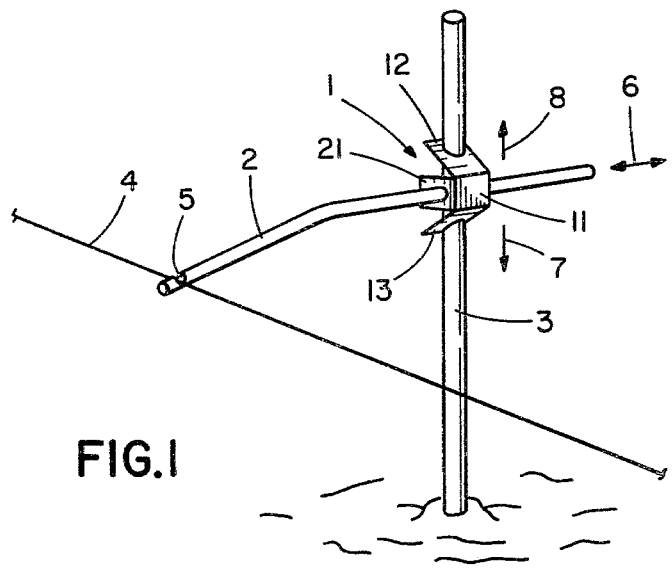
FIG. 1 is a view of the compound clamp of this invention applied to a construction line rod and stake to support an automatic machine control stringline.
Figure 2:
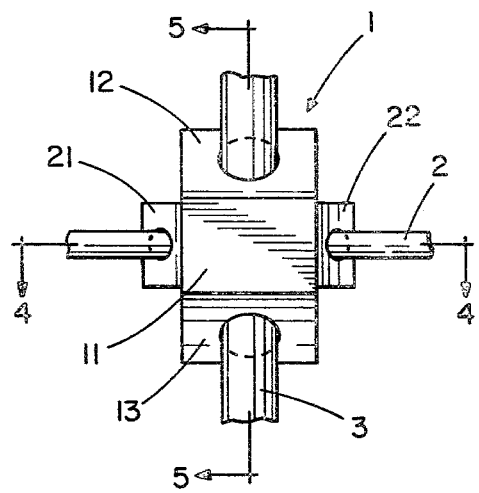
FIG. 2 is a side elevation view taken from the clamp base side of the compound clamp of FIG. 1.

Referring now to FIG. 1 of the drawings, compound clamp 1 of this invention is shown applied to a construction line rod 2 and a construction line rod stake 3 to support an automatic machine control stringline 4. Line rod 2 is formed with groove 5 so that stringline 4 may be engaged and retained by rod 2.

Compound clamp 1 adjustably clamps rod 2 and stake 3 one to the other so that both the vertical and horizontal disposition of stringline 4 may be independently adjusted. In particular, line rod 2 may be moved in the general horizontal direction as is shown by arrows 6 (FIG. 1) without effecting a vertical change in the stringline. Similarly, clamp 1 may be lowered or raised in the vertical direction as is shown by arrows 7 and 8 (FIG. 1) without effecting a horizontal movement of the stringline.

In most of the prior art compound clamps for stringlines, or saddle brackets as they are sometimes called, adjustments are made mechanically by using tools, such as screwdrivers or wrenches. In the present device, no such tools are required and simple manual compression of either or both of the yokes for compound clamp 1 can effect the necessary positioning of stringline 2 in both the horizontal and vertical directions. Due to the fact that an instant adjustment of clamp 1 is attainable by a simple manual operation without tools, considerable labor-saving construction time ensues.

Figure 3:
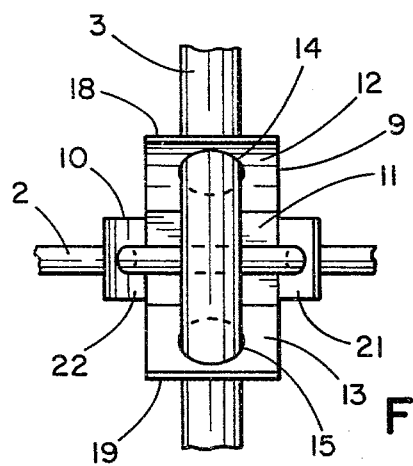
FIG. 3 is a side elevation view taken from the clamp arm side of the compound clamp of FIG. 1.

Referring now to all of the Figures of the drawings, the compound clamp comprises two crossed resilient yokes 9 and 10. The entire compound clamp 1, including yokes 9 and 10, are formed from an integral single resilient metal piece. Yokes 9 and 10 are joined together by a flat rectangular base section 11. In particular, long yoke 9 is formed with a pair of two long resilient apertured arms 12 and 13 which project from the set of horizontal sides of rectangular base section 11. Long yoke 9 is generally concave in configuration as is viewed in FIG. 3, for example.

Each of arms 12 and 13 is formed with a circular aperture 14 and 15, respectively. Apertures 14 and 15 are slightly oversized with respect to stake 3 so that the stake will pass easily through these apertures when long arm 12 is manually depressed downwardly and long arm 13 is manually lifted upwardly in the direction of the arrows 16 and 17 (FIG. 6) by manual engagement with finger grip yoke sections 18 and 19.

Figure 5:
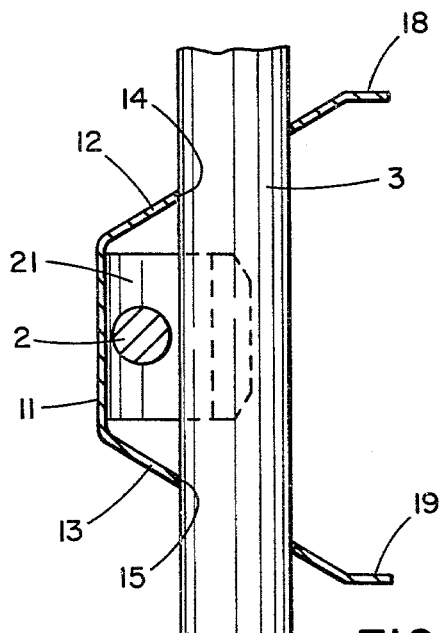
FIG. 5 is a section view taken along line 5—5 of FIG. 2 which shows the stake clamp yoke attachment to the line stake of FIG. 1.
Figure 6:
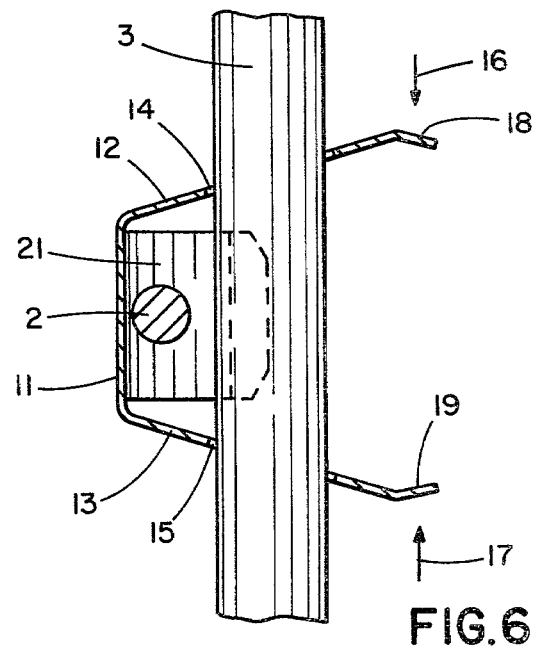
FIG. 6 is a view related to FIG. 5 which shows the unclamping of the stake clamp yoke.

When long yoke is manually released from the stake 3 adjustment position shown in FIG. 6, resilient long arms 12 and 13 spring outwardly to engage tightly stake 3 (FIG. 5).

Short yoke 10 is formed with a pair of two short resilient apertured arms 21 and 22 which project from the set of vertical sides of rectangular base section 11.

Figure 4:
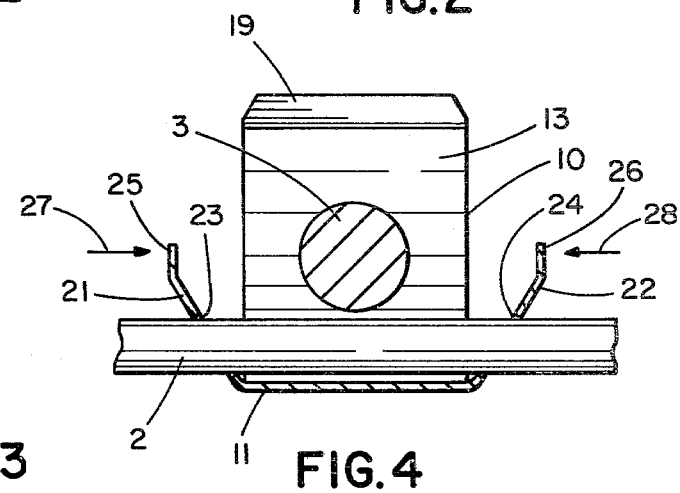
FIG. 4 is a section view taken along line 4—4 of FIG. 2 which shows the rod clamp yoke attachment to the line rod of FIG. 1.

Each of arms 21 and 22 is formed with circular apertures 23 and 24, respectively (FIG. 4). Apertures 23 and 24 are slightly oversized relative to stringline rod 2, as is best shown in FIG. 4.

The manual operation of finger grip sections 25 and 26 on short yoke arms 21 and 22, respectively, in the direction of arrows 27 and 28 (FIG. 4) loosens the resilient clamp of short yoke 10 and enables rod 2 to be moved horizontally relative to compound clamp 1 and also stake 3.

As is readily apparent, rod 2 may be adjustably moved without effecting the positioning of clamp 1 on stake 3. In particular, the manual depression of finger grip sections 25 and 26 enables rod 2 to be moved on its longitudinal axis only; because, stake 3 is firmly engaged by long yoke 9 and thus the horizontal position of rod 2 is maintained. Similarly, the manual operation of finger grip sections 18 and 19 to effect movement of the compound clamp 1 on stake 3 does not alter the horizontal stringline adjustment, but merely effects an independent vertical adjustment (unless, however, clamp 1 is rotated on stake 3).

It is noted that with the construction described, no adjusting tools are needed; and that there are no parts having threads which can be damaged.

The nesting of rod 2 within stake 3 provides an important reinforcing function. Rod 2 strengthens the short yoke and in so strengthening the short yoke it strengthens the clamping function of the long yoke on stake 3. Similarly, the engagement of stake 3 by long yoke 9 strengthens the long yoke. The strengthening of this yoke similarly strengthens the clamping attachment of the short yoke on rod 2.

When the compound clamp of the described construction is removed from its attaching engagement with rod 2 and stake 3, several of the compound clamps can be nested within one another in view of the cup-like concave construction formed by both yokes. Accordingly, a minimal storage or shipping space is required for a group of the described clamps. Additionally, the clamps may be individually removed from nesting engagement relatively easily.

It should be understood the above described construction is merely illustrative of the application of the features of this invention, and variations can be made without departing from the scope of the invention. For example, the described clamp need not be used as a stringline rod and stake bracket. The clamp is entirely suitable for adjustably clamping two elongated elements in a substantially right angle disposition with respect to one another.

What is claimed is:

1. A compound clamp having two crossed resilient yokes formed from an integral metal piece comprising a generally rectangular and flat base section for the two yokes, two long resilient and apertured arms projecting from a first set of opposite sides of the base section to define a first generally concave long yoke configuration, two short resilient and apertured arms projecting from a second set of opposite sides of the base section to define a second generally concave short yoke configuration, the two yokes being generally disposed at right angles with respect to one another with the apertures of the short yoke being of a different size than the apertures of the long yoke, and each yoke arm being formed at the projecting extremity of the arm with a finger grip section by which the manual depression of two opposite finger grip sections loosens the resilient yoke clamp on a first elongated element inserted in the first yoke to enable relative movement of that element relative the yoke and, without disturbing the clamping engagement of a second elongated element inserted in the other yoke, whereby both elements are adjustably cross clamped.

* * * * *